United States Patent [19]

Schwertlein et al.

[11] Patent Number: 4,945,444

[45] Date of Patent: Jul. 31, 1990

[54] INTEGRATABLE CIRCUIT CONFIGURATION FOR REVERSE CURRENT REDUCTION IN AN INVERSELY OPERATED TRANSISTOR

[75] Inventors: Frank-Lothar Schwertlein, Munich; Michael Lenz, Zorneding, both of Fed. Rep. of Germany

[73] Assignee: Siemens Aktiengesellschaft, Munich, Fed. Rep. of Germany

[21] Appl. No.: 455,553

[22] Filed: Dec. 18, 1989

[30] Foreign Application Priority Data

Dec. 21, 1988 [EP] European Pat. Off. ........ 88121417.5

[51] Int. Cl.[5] ........ H02H 3/08

[52] U.S. Cl. ........ 361/101; 361/84; 323/277; 307/127

[58] Field of Search ........ 361/77, 82, 84, 87, 361/93, 98, 101; 382/276, 277, 278; 307/127

[56] References Cited

U.S. PATENT DOCUMENTS

| | | | |
|---|---|---|---|
| 3,970,869 | 7/1976 | Coats, Jr. | 361/98 |
| 4,420,786 | 12/1983 | Toney | 361/77 |
| 4,677,519 | 6/1987 | Rodriguez et al. | 361/121 |
| 4,782,280 | 11/1988 | Lommers | 323/278 |

OTHER PUBLICATIONS

Electronic Engineering, Sep. 1972, vol. 44, No. 535, pp. 61-63; L. S. Cornish, "Transient Testing Vital To, Etc.".

Patent Abstracts of Japan, vol. 9, No. 44, (P-337) (1767), Feb. 23, 1985, JP-A-59 183419 (Fujitsu), Oct. 18, 1984.

Sanken New Products Information, T-101, "Low Dropout Hybrid Voltage Regulator", Sanken Electric Co.

*Primary Examiner*—Derek S. Jennings

*Attorney, Agent, or Firm*—Herbert L. Lerner; Laurence A. Greenberg

[57] ABSTRACT

An integratable circuit configuration includes a first transistor of one conduction type having an emitter being acted upon by a first potential, a collector being acted upon by a second potential, a base, a base-to-collector path and a base-to-emitter path. A resistor is connected in parallel with the base-to-emitter path of the first transistor. A second transistor of the other conduction type is connected to the base of the first transistor for triggering. A diode may be connected in parallel with the base-to-collector path of the first transistor. The diode conducts in inverse operation for reverse current reduction during inverse operation of the first transistor. A third transistor may be connected to the first transistor instead of the diode and fourth and further transistors may also be connected to the first transistor.

8 Claims, 1 Drawing Sheet

Figure 1:
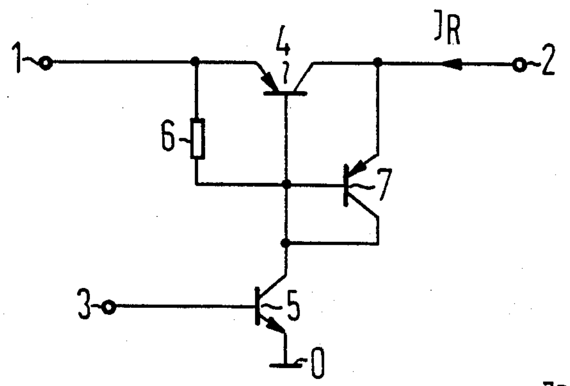

INTEGRATABLE CIRCUIT CONFIGURATION FOR REVERSE CURRENT REDUCTION IN AN INVERSELY OPERATED TRANSISTOR

The invention relates to an integratable circuit configuration having a first transistor of a first conduction type with an emitter acted upon by a first potential and a collector acted upon by a second potential, a resistor connected in parallel with the base-to-emitter path of the first transistor, and a second transistor of the second conduction type for triggering the base of the first transistor. If amplifiers or voltage regulators, for example, are operated with a capacitive load and if the supply voltage collapses during such operation, the result is an output voltage which is substantially higher than the input voltage. In voltage regulators in general, the outputs are wired with smoothing capacitors as a rule. In other words, voltage regulators are typically operated at capacitive load. In the event of a short circuit at the input of a low-dropout voltage regulator, for example, which may be caused by shutoff of the voltage supply, to which other consumers are also connected, the voltage at the input of the voltage regulator moves toward zero, while the voltage at the output thereof is still maintained initially by the smoothing capacitors. As a result, a current flows in a direction contrary to the original direction. This is also known as a reverse current and can cause functional impairment, to the extent of destruction of the voltage regulator, since in this kind of operation, hereinafter called inverse operation, the output transistor of the voltage regulator conducts from the output to the input of the voltage regulator. In a low-dropout voltage regulator which is known, for instance, from Sanken New Products Information, "Low-Dropout Hybrid Voltage Regulator", of Sanken Electric Company, an external diode is connected between the output and the input of the voltage regulator as a protection in inverse operation, in such a way that it blocks in normal operation while it is conducting in inverse operation. The reverse current is thus carried completely or partially through the diode. However, the disadvantage of such a device is that the smoothing capacitor is discharged quickly again, as in operation without the diode, so that the voltage at the output of the voltage regulator drops quickly. This is particularly undesirable for power packs in microcomputer systems. It is accordingly an object of the invention to provide an integratable circuit configuration for reverse current reduction in an inversely operated transistor, which overcomes the hereinafore-mentioned disadvantages of the heretofore-known devices of this general type and which at least reduces the reverse current in an inversely operated transistor.

With the foregoing and other objects in view there is provided, in accordance with the invention, an integratable circuit configuration, comprising a first transistor of one conduction type having an emitter being acted upon by a first potential, a collector being acted upon by a second potential, a base, a base-to-collector path and a base-to- emitter path, a first resistor connected in parallel with the base-to-emitter path of the first transistor, a second transistor of the other conduction type being connected to the base of the first transistor for triggering, and a diode connected in parallel with the base-to-collector path of the first transistor, the diode conducting in inverse operation for reverse current reduction during inverse operation of the first transistor.

With the objects of the invention in view there is also provided an integratable circuit configuration, comprising a first transistor of one conduction type having an emitter being acted upon by a first potential, a collector being acted upon by a second potential, a base, a base-to-collector path and a base-to-emitter path, a second transistor of the other conduction type being connected to the base of the first transistor for triggering, a third transistor of the one conduction type, instead of the diode, having a collector and having a base-to-emitter path connected in parallel with the base-to-collector path of the first transistor, a fourth transistor of the one conduction type having a base connected to the collector of the third transistor and having an emitter-to-collector path connected in parallel with the base-to-emitter path of the first transistor, and a monitoring circuit connected to the base of the fourth transistor directly or through further switching elements for making the fourth transistor conducting when the first potential exceeds a given value. In accordance with a another feature of the invention, there is provided a further transistor of the first conduction type normally conducting to a certain extent and having an emitter-to-collector path connected in parallel with the base-to-emitter path of the first transistor and having a base connected directly or through further switching elements to the monitoring circuit for blocking the further transistor when the first potential exceeds a given value, the third transistor having an additional collector connected directly or through further switching elements to the base of the further transistor for blocking the further transistor.

In accordance with a concomitant feature of the invention, the base of the first transistor forms the base of the third transistor, the collector of the first transistor forms the emitter of the third transistor, and a further diffusion structure or structures form the collector or collectors of the third transistor.

The advantage of the invention is that by virtually completely blocking the transistor in inverse operation, only a slight reverse current flows, and the transistor itself is protected against functional impairment or destruction. This is particularly advantageous for use as an output transistor of a low-dropout voltage regulator, because the voltage of the output drops more slowly.

Other features which are considered as characteristic for the invention are set forth in the appended claims.

Although the invention is illustrated and described herein as embodied in an integratable circuit configuration for reverse current reduction in an inversely operated transistor, it is nevertheless not intended to be limited to the details shown, since various modifications and structural changes may be made therein without departing from the spirit of the invention and within the scope and range of equivalents of the claims.

Figure 2:
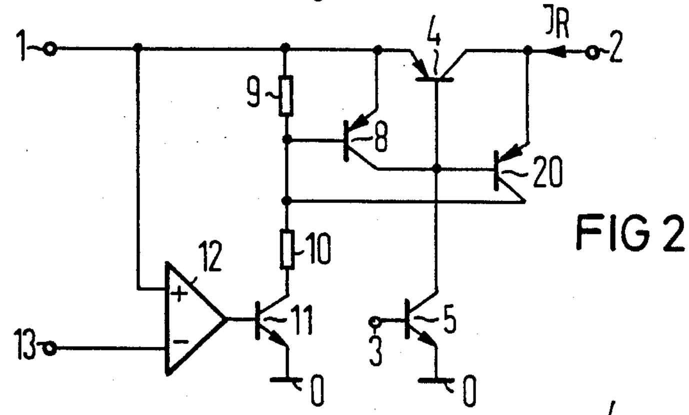
Figure 3:
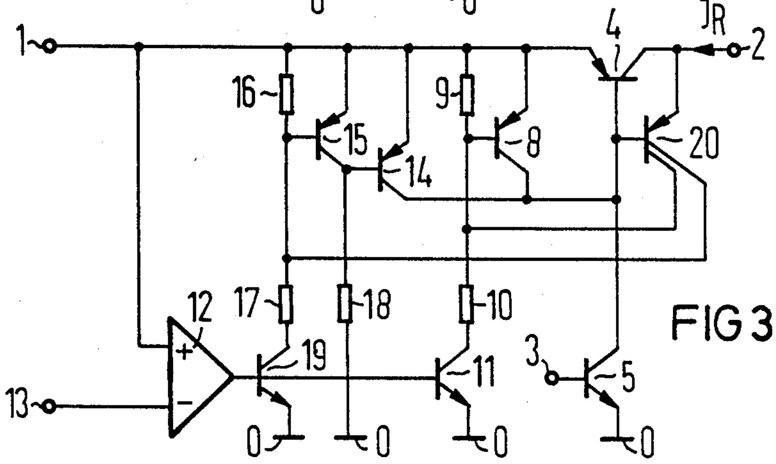

The construction and method of operation of the invention, however, together with additional objects and advantages thereof will be best understood from the following description of specific embodiments when read in connection with the accompanying drawings FIG. 1 is a schematic circuit diagram of a first exemplary embodiment of a circuit configuration according to the invention;

FIG. 2 is a circuit diagram of a second, further expanded embodiment of a circuit configuration according to the invention, having greater voltage stability; and FIG. 3 is a circuit diagram of a further feature of the embodiment of FIG. 2.

Referring now in detail to the figures of the drawings, in which the same elements are identified by the same reference numerals and first, particularly, to FIG. 1 thereof, there is seen an exemplary embodiment of a typical output stage of a low-dropout voltage regulator having a first p-n-p transistor 4, the emitter of which is acted on by a first potential 1 and the collector of which is acted on by a second potential 2. The base-to-emitter path of the first transistor 4 is connected in parallel with a first resistor 6. The base of second n-p-n transistor 5, the emitter of which is carried to reference potential 0 and the base of which receives a control potential 3 for triggering in the regular operating mode. According to the invention, a p-n-p transistor 7 is connected in parallel with the base-to-collector path of the first transistor 4. Since the base and the collector of the p-n-p transistor 7 are wired together, it is operated as a diode and is conducting in inverse operation.

FIG. 2 shows the exemplary embodiment of FIG. 1 which has been expanded by providing a third transistor 20 having the emitter thereof connected to the collector of the first transistor 4 and the base thereof connected to the base of the first transistor 4. A fourth p-n-p transistor 8 has the emitter thereof connected to the first potential 1 and the collector thereof connected to the base of the first transistor 4. The collector of the third transistor 20 is wired both to the base of the fourth p-n-p transistor 8 and to a second and a third resistor 9, 10. In this case, the first resistor 6 and the transistor 7 which is operated as a diode in FIG. 1, are omitted. The second resistor 9 is carried to the first potential 1, and the third resistor 10 is carried to the collector of a fifth n-p-n transistor 11, the emitter of which is at reference potential 0 and the base of which is connected to the output of a comparator 12. The non-inverting input of the comparator 12 is acted upon by the first potential 1 and the inverting input is exposed to a reference potential 13.

In FIG. 3 of the drawing, the exemplary embodiment of FIG. 2 has been expanded by providing a sixth or further p-n-p transistor 14, a seventh p-n-p transistor 15, an eighth n-p-n transistor 19, and fourth, fifth and sixth resistors 16, 17, 18. The sixth transistor 14 has the emitter thereof connected to the first potential 1 and the collector thereof connected to the base of the first transistor 4. The base of the sixth transistor 14 is firstly connected to the sixth resistor 18 leading to the reference potential 0 and is secondly connected to the collector of the seventh transistor 15. The emitter of the seventh transistor 15 is connected to the first potential 1. The base of the seventh transistor 15, in turn, is wired to the fourth resistor 16 leading to the first potential 1 and to the fifth resistor 17 connected to the collector of the eighth transistor 19. Moreover, an additional collector of the third transistor 20 is also connected to the base of the seventh transistor 15. The emitter of the eighth transistor 19 is connected to the reference potential 0. The base of the eighth transistor 19 and the base of the fifth transistor 11, are connected to the output of the comparator 12.

Due to the specification of the particular conduction type for the transistors and for the exemplary embodiments, positive values are obtained in each case for the first and second potentials 1, 2, the reference potential 13, and the control or trigger potential 3, as compared with the reference potential 0. In the regular operating mode, the first potential 1 has a higher value than the second potential 2.

Now that the basic layout of the exemplary embodiments shown in the figures of the drawing has been explained, the mode of operation will be described in further detail below.

In inverse operation of the first transistor 4, that is when the second potential 2 is greater than the first potential 1, the collector operates as an inverse emitter, and the emitter operates as an inverse collector. However, since in FIG. 1 the base of the first transistor 4 is connected through the first resistor 6 to the inverse collector, the first transistor 4 is made inversely conducting. However, due to the transistor 7 which is operated as a diode, the base current of the first transistor 4 is reduced to such an extent that a reduction in the reverse current $I_R$ results through the inverse current gain $b_4$ of the first transistor 4.

As shown in FIG. 2, in order to increase the voltage stability of the first transistor 4, this transistor is clamped by means of the fourth transistor 8, in the event of an excessively high first potential 1. The triggering of the fourth transistor 8 is effected through a monitoring circuit having the comparator 12, which compares the first potential 1 with the reference potential 13, and in the event of an excessive increase in the first potential 1 makes the fourth transistor 8 conducting, through the fifth transistor 11 in combination with the second and third resistors 9, 10.

In the event that the second potential 2 is higher than the first potential 1, the first transistor 4 and the fourth transistor 8 are inversely conducting. The following relationship results for the reverse current $I_R$, as a function of the base current $I_{B8}$ of the fourth transistor 8 and the inverse current gains $b_4$, $b_8$ of the first and fourth transistor 4, 8:

$$I_R = I_{B8} \cdot (1 + b_4) \cdot (1 + b_8).$$

Without taking the third transistor 20 into account, the base current IB4 of the fourth transistor 4 is equal to the quotient of the voltage across the second resistor 9 and its resistance. By adding the third transistor 20 in the manner described, the result is a base current $I_{B8}$ for the fourth transistor 8 that is lowered by the amount of the collector current of the third transistor 20. In accordance with the above equation, the result is a lower reverse current $I_R$, because the first transistor 4 is controlled less strongly or powerfully. The advantage is that two previously contradictory requirements for an output transistor, namely greater voltage stability in normal operation and a lower reverse current in inverse operation, are met while keeping the same electrical properties in normal operation, in a circuit configuration in accordance with the invention.

As compared with FIG. 2, the exemplary embodiment shown in FIG. 3 includes one additional stage having a sixth transistor 14, a seventh transistor 15, an eighth transistor 17, and fourth, fifth and sixth resistors 16, 17, 18. In normal operation, this stage acts as an active discharger, as compared with the first resistor 6 of FIG. 1, due to the sixth transistor 14 located between the emitter and the base of the first transistor 4. In the event of an overly high first potential 1, the sixth transistor 14 is blocked by the comparator 12 and the ensuing portion of the circuit, while the fourth transistor 8, which is likewise triggered by the comparator 12, clamps the first transistor 4. As a result, the first transistor 4 is blocked, which on one hand increases its voltage stability and on the other allows a higher current gain for normal operation. A higher current gain in turn improves the efficiency of the circuit configuration. In inverse operation, both the first transistor 4 and the fourth transistor 8, the third transistor 20 and the sixth transistor 14 are largely blocked, and as a result only a very low reverse current IR results. Accordingly, the advantage of this embodiment of a circuit configuration according to the invention is that not only a low reverse current in inverse operation, but also increased voltage stability with greater efficiency in normal operation, are attained. Advantageously, according to a feature of the invention, only one additional diffusion structure for the collector or collectors of the third transistor 20 needs to be incorporated in the circuit configuration. The base of the first transistor 4 is provided as the base of the third transistor 20, and the collector of the third transistor 20 is provided as the emitter. This has the advantage of a low circuitry cost and requires little space. In closing, it can be noted that the monitoring circuit is not restricted merely to an embodiment having a comparator. For instance, circuits with Zener diodes and/or non-linear voltage dividers are also suitable.

We claim:

1. Integratable circuit configuration, comprising a first transistor of one conduction type having an emitter being acted upon by a first potential, a collector being acted upon by a second potential, a base, a base-to-collector path and a base-to-emitter path, a resistor connected in parallel with the base-to-emitter path of said first transistor, a second transistor of the other conduction type being connected to the base of said first transistor for triggering, and a diode connected in parallel with the base-to-collector path of said first transistor, said diode conducting in inverse operation for reverse current reduction during inverse operation of said first transistor.

2. Integratable circuit configuration, comprising a first transistor of one conduction type having an emitter being acted upon by a first potential, a collector being acted upon by a second potential, a base, a base-to-collector path and a base-to-emitter path, a second transistor of the other conduction type being connected to the base of said first transistor for triggering, a third transistor of the one conduction type having a collector and having a base-to-emitter path connected in parallel with the base-to-collector path of said first transistor, a fourth transistor of the one conduction type having a base connected to the collector of said third transistor and having an emitter-to-collector path connected in parallel with the base-to-emitter path of said first transistor, and a monitoring circuit connected to the base of said fourth transition for making said fourth transistor conducting when the first potential exceeds a given value.

3. Integratable circuit configuration according to claim 2, including switching elements connected between the base of said fourth transistor and said monitoring circuit.

4. Circuit configuration according to claim 2, including a further transistor of the first conduction type normally conducting to a certain extent and having an emitter-to-collector path connected in parallel with the base-to-emitter path of said first transistor and having a base connected to said monitoring circuit for blocking said further transistor when the first potential exceeds a given value, said third transistor having an additional collector connected to the base of said further transistor for blocking said further transistor.

5. Circuit configuration according to claim 4, including switching elements connected between the base of said further transistor and said monitoring circuit.

6. Circuit configuration according to claim 4, including switching elements connected between the additional collector of said third transistor and the base of said further transistor.

7. Circuit configuration according to claim 2, wherein the base of said first transistor forms the base of said third transistor, the collector of said first transistor forms the emitter of said third transistor, and a further diffusion structure forms the collector of said third transistor.

8. Circuit configuration according to claim 4, wherein the base of said first transistor forms the base of said third transistor, the collector of said first transistor forms the emitter of said third transistor, and further diffusion structures form the collectors of said third transistor.

* * * * *